A. ECKERT.
Preserving Process.

No. 52,980.          Patented Mar. 6, 1866.

UNITED STATES PATENT OFFICE.

AUGUSTUS ECKERT, OF TRENTON, OHIO.

IMPROVEMENT IN PREPARING FRUIT AND VEGETABLES FOR PRESERVING.

Specification forming part of Letters Patent No. 52,980, dated March 6, 1866.

*To all whom it may concern:*

Be it known that I, A. ECKERT, of Trenton, Butler county, State of Ohio, have invented a new and Improved Method of Treating or Preparing Fruit or Vegetables when to be preserved in cans, jars, or other vessels ordinarily used therefor; and I do hereby declare that the following is a full, clear, and exact description thereof, which will enable others skilled in the art to make and use the same, reference being had to the accompanying drawings, forming part of this specification.

By the present and now most common mode of preparing fruit and vegetables for being preserved in cans, jars, &c., the fruit is placed in a copper, brass, or other suitable kettle together with a sufficient quantity of water, and then heated by setting such kettle on the stove or fire; but, as the fruit in the bottom of the kettle necessarily heats much quicker than that at the upper portion, the fruit must consequently be stirred about sufficiently to equalize the heat imparted to it and prevent any portion from burning, by which stirring the fruit becomes greatly broken and mashed up, oftentimes to such degree as to be almost a pulp, thus completely spoiling it; and, again, in lieu of treating the fruit as above stated, it is put into the cans in which it is kept or preserved, and these cans then in turn in a kettle of water, where they are retained until the fruit is heated thoroughly, but which, by this method, it is exceedingly difficult to do, and the fruit consequently soon spoils and is of no use.

By my invention, however, the disadvantages attending the above-stated modes of treating or preparing fruits, &c., for being preserved in cans, jars, &c., are entirely obviated, it consisting in placing the fruit to be prepared in a vessel made of wire-gauze or of any other suitable material having openings or meshes, or made of any porous substance or material, which vessel is then so suspended in any proper manner within a vessel containing water as to be above the surface of the water, so that by closing the said water-vessel and subjecting the water to the action of heat from any suitable stove or fire, the fruit so suspended therein will be acted upon by the steam thus generated within the said vessel or boiler, and consequently thoroughly heated thereby, when, removing the cover from the boiler, the fruit can be then placed in the jars or cans previously suitably prepared for its reception, the drippings from the said fruit-vessel as its fruit is acted upon by the steam in the boiler being caught by a vessel suitably arranged or hung below the same therefor.

Figure 1:
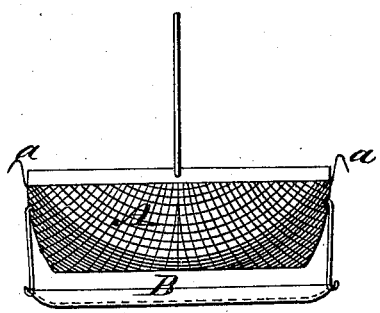
Figure 2:
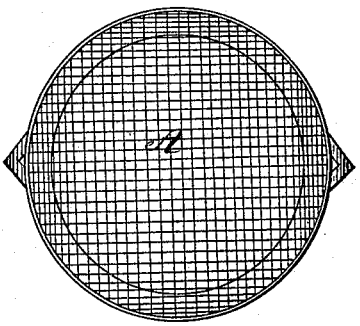

In accompanying plate of drawings one form of vessels for carrying out my improved mode of preparing fruit for preservation in cans, jars, and other similar vessels is illustrated, Figure 1 being a side view of the same; Fig. 2, a plan or top view of the perforated or fruit vessel or receptacle.

Similar letters of reference indicate like parts.

A in the drawings represents a vessel made somewhat of a cup or pan shape, but of wire gauze, netting, or other similar material, having openings or meshes, and of a circular shape, with hooks *a a* at suitable points for hanging it by within a kettle of corresponding shape thereto, to which vessel, but so as to be a little below the same, is hung another vessel, made of sheet metal or other similar material, which lower vessel when the fruit contained in the perforated or porous vessel above it is being subjected to the action of steam for the purpose of heating, as hereinbefore stated, receives and catches all the drippings therefrom and prevents them from entering the water in the boiler or kettle below, which drippings, when the fruit is placed in the can or jar suitably prepared to receive it, after being sufficiently heated by the steam, as explained, can be or not, as may be deemed best, poured in and upon the top of the same.

By forming the vessel holding the fruit while being heated by steam of wire-gauze or other suitable perforated material, or even of a porous but suitable substance, it is obvious that whatever moisture may settle upon the fruit can freely escape from it, thus preventing the fruit from absorbing water to any great degree, and consequently from being injured thereby not only in its appearance but in its taste, the importance of which is manifest.

The under or dripping vessel may be dispensed with if so desired; but I deem it best to use it, as the juice extracted from the fruit by the action of the steam on it is thus all saved, and can be poured into the can or jar in which such fruit is to be kept.

I claim as new and desire to secure by Letters Patent—

1. Subjecting fruit, vegetables, and other similar substances to the action of steam in a closed vessel, by suspending the fruit, &c., in such vessel in a vessel made of wire-gauze or other suitable perforated or porous material, substantially as herein described and for the purpose specified.

2. The combination of the two vessels A and B, arranged with regard to each other substantially as and for the purpose specified.

AUGUSTUS ECKERT.

Witnesses:
CHAS. C. WEAVER,
CHAS. A. POTTER.